United States Patent Office 3,524,357
Patented Aug. 18, 1970

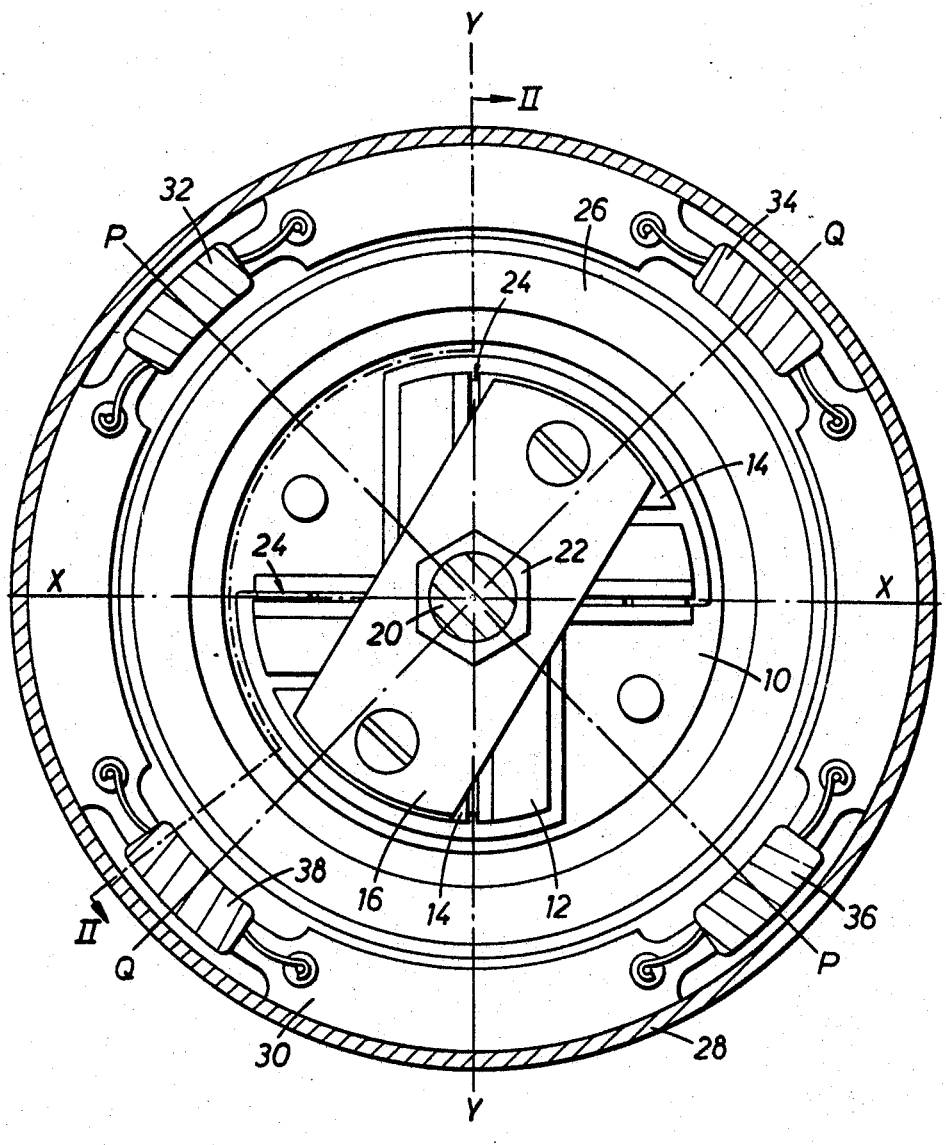

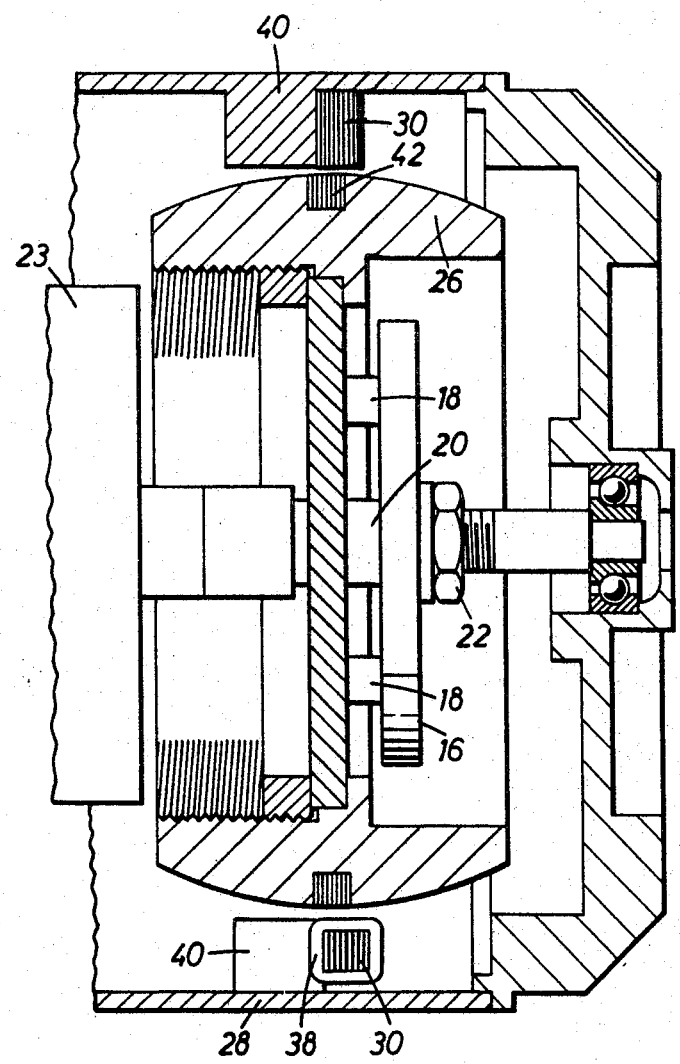

3,524,357
PICKOFF ARRANGEMENTS
Norman John Myall, Watford, England, assignor to S. G. Brown Limited, Watford, England, a British company
Filed June 20, 1967, Ser. No. 647,549
Claims priority, application Great Britain, June 22, 1966, 27,800/66
Int. Cl. G01c 19/28
U.S. Cl. 74—5.6                   8 Claims

ABSTRACT OF THE DISCLOSURE

The disclosure relates to electric pickoff means.

The disclosure is of pickoff means for providing electric signals indicating deflection of a two degree of freedom gyro wheel about perpendicular axes at right angles to the axis of the rotation of the wheel. The pickoff means has an annular stator core of stacked laminations with four coils wound thereabout at equally spaced positions. The stator core surrounds the gyro wheel and co-operates with a rotor in the form of a second stack of laminations set in the wheel. The stator assembly provides a flux path perpendicular to the axis about which movement of the gyro wheel is measured and has an internal diameter greater than the outer diameter of the wheel.

The invention relates to pickoff arrangements for rotating bodies such as gyroscope rotors.

Gyroscope pickoffs are designed to provide electric signals having characteristics dependent on the displacement of the gyroscope rotor from some predetermined position. The major object of the present invention is to provide an improved pickoff arrangement.

The invention accordingly provides pickoff means for providing an electric signal dependent on the angular orientation of a rotatable body with respect to an axis at right angles to the axis of rotation, the pickoff means comprising a stator assembly having coil means on a core transverse to the axis of rotation and means on the body for varying the inductance of the coil means in accordance with changes in the angular orientation thereof.

The stator core can be constituted as an annular stack of magnetizable laminations with coils constituting the coil means wound therearound and the rotatable body can have a peripheral band of such laminations which may be set into a slot in the surface of the body. For use with a two degree of freedom gyro rotor arrangements, as disclosed, for example, in U.S. application Ser. No. 647,548, four equally spaced coils will be provided so that displacements about two perpendicular axes perpendicular to the driving shaft axis can be measured.

By way of example only, an embodiment of the invention is described below with reference to the accompanying drawings, in which:

FIG. 1 is a view along the axis of a gyroscope assembly incorporating pickoff means embodying the invention; and FIG. 2 is a sectional side view of the gyroscope assembly taken on the line II—II of FIG. 1.

The gyro rotor assembly illustrated is in accordance with the disclosure of the aforementioned U.S. application and thus comprises a metal disc which has been cut so as to separate an outer rotor portion 10 from the interior part of the disc. The interior is also cut to form a central gimbal portion 12 and a pair of spaced mounting portions 14 between the gimbal and rotor portions, the mounting portions being rigidly secured to a diametrically extending bridge or yoke 16. The bridge 16 is axially spaced from the mounting portions 14 by spacers 18 and is fixedly secured on a driving shaft 20 by a nut 22. The shaft 20 extends with clearance through a central aperture in the gimbal portion 12 to an electric motor 23 by which the gyro assembly can be rotated at a speed at which it is theoretically decoupled from its suspension.

Two pairs of flexural spring pivots 24 on orthogonal axes connect the gimbal portion 12 to the mounting portions 14 and to the rotor portion 10 to afford the gyro two degrees of freedom. Secured to the rotor portion 10 is a gyro wheel 26 which has the general form of a short sleeve concentric with the shaft 20, the outer surface of the wheel being spherical about the centre of suspension of the gyro. The assembly is housed within a generally cylindrical casing 28 with the shaft 20 extending axially. The gyroscope can if desired include the torsional restraint arrangements of U.S. application Ser. No. 648,897 and the aerodynamic control means of U.S. application Ser. No. 647,550.

The pickoff arrangement of the invention is embodied as a stator 30 comprising a thin stack of annular ferrous laminations having four equal coils 32, 34, 36 and 38 wound thereon at equally spaced positions. The stator 30 is mounted within the casing 28 by securement to angularly spaced lugs 40 projecting inwardly of the casing wall so as to surround the wheel 26 which has let into a slot in its spherical outer surface a second stack 42 of ferrous laminations which constitutes the pickoff rotor. The casing 28 and the gyro assembly are of course of non-magnetic material.

The opposed faces of the two sets 30 and 42 of laminations are slightly axially spaced as shown in FIG. 2 so that the local adjacent common area varies with angular displacement of the gyro wheel. The laminations of the stator 30 are reduced in radial thickness for the relatively short circumferential lengths occupied by the coils 32, 34, 36, 38, the ends of which are secured to terminal points on the laminations.

The pickoff arrangement illustrated can be used to measure angular displacement of the gyro wheel 26 about a pair of perpendicular axes PP, QQ extending through the centres of the coils 32, 36 and 34, 38 respectively. Alternatively, the arrangement can be used to measure angular displacement of the wheel 26 about perpendicular axes XX, YY extending midway between the coils, both pairs of axes being perpendicular to the axis of the shaft 20.

Either measurement can be made by using the coils as elements in a bridge circuit energised by a suitable A.C. supply, the axes about which displacement is measured being determined by the bridge connections, as with known pickoff arrangements. As the other bridge elements, there may be used resistors or further coils wound on the stator core over the coils 32, 34, 36, 38.

It will be evident that pickoff arrangements embodying the invention can be of very simple and symmetrical construction. They can afford high sensitivity because the pole face can be of advantageously large circumferential dimension, with a very small air gap between the rotor and stator, without the need to produce core elements with pole faces shaped as portions of a sphere. Moreover, the stator assembly need have no internal diameter smaller than the greatest external diameter of the gyro rotor assembly at least in one axial direction, so that the gyroscope can be assembled by simply sliding the gyro wheel assembly longitudinally into the casing. The pickoff means is substantially insensitive to any axial displacement of the rotor. It will be noted that the flux path of the pickoff means has no component in the direction axially of the gyroscope; it is essentially perpendicular to the axis about which displacement is being measured, affording a substantial improvement over conventional pickoffs.

The invention is of course not confined to use with the gyro-rotor construction of U.S. application Ser. No. 647,548 and it can be embodied in a variety of ways other than as described without departing from its scope as defined by the following claims.

I claim:

1. Pickoff means for detecting the angular displacement of the spin of axis of a rotatable body from a drive axis about which torque to spin the body is applied, said pickoff means comprising a stator assembly, said stator assembly including an annular stator core and coil means wound around said stator core in a direction axially thereof, means fixedly locating said stator assembly with said core around the body coaxially with the drive axis, and rotor means mounted on said body for varying the inductance of said coil means in accordance with the angular displacement of the spin axis from the drive axis.

2. Pickoff means as claimed in claim 1 wherein said rotor means comprises a stack of laminations set into the outer surface of said rotatable body.

3. Pickoff means as claimed in claim 1 wherein said coil means comprises a first pair of coils positioned on said stator core at diametrically opposed positions.

4. Pickoff means as claimed in claim 3 wherein said coil means additionally comprises a second pair of coils positioned on the stator core at diametrically opposed positions, the diameters on which said first and second pairs of coils are positioned being at right angles.

5. Pickoff means as claimed in claim 1 wherein said stator core comprises an annular stack of laminations.

6. Pickoff means as claimed in claim 1 wherein said stator core has a reduced cross-sectional area over the length of said coil means.

7. Pickoff means as claimed in claim 1, 3 or 4 wherein the least internal diameter of said stator assembly exceeds the greatest diameter of said rotatable body in at least one axial direction.

8. Pickoff means as claimed in claim 1 wherein said rotatable body is constituted by a gyro rotor, a casing encloses said gyro rotor, and the stator core is mounted in said casing.

References Cited

UNITED STATES PATENTS

| | | | |
|---|---|---|---|
| 2,948,155 | 8/1960 | Burkam | 74—5.6 |
| 3,077,785 | 2/1963 | Stiles | 74—5 |
| 3,107,540 | 10/1963 | Curriston | 74—5.6 |
| 3,176,523 | 4/1965 | Amlie | 74—5.6 |
| 3,354,726 | 11/1967 | Krupick et al. | 74—5 |

FRED C. MATTERN, Jr., Primary Examiner

F. D. SHOEMAKER, Assistant Examiner